US008017563B2

(12) United States Patent
Freeman et al.

(10) Patent No.: US 8,017,563 B2
(45) Date of Patent: Sep. 13, 2011

(54) DIVERTING COMPOSITIONS, FLUID LOSS CONTROL PILLS, AND BREAKERS THEREOF

(75) Inventors: Michael A. Freeman, Kingwood, TX (US); Bethicia B. Prasek, The Woodlands, TX (US); Robert L. Horton, Sugar Land, TX (US)

(73) Assignee: M-I L.L.C., Houston, TX (US)

(*) Notice: Subject to any disclaimer, the term of this patent is extended or adjusted under 35 U.S.C. 154(b) by 518 days.

(21) Appl. No.: 11/683,781

(22) Filed: Mar. 8, 2007

(65) Prior Publication Data

US 2007/0213233 A1 Sep. 13, 2007

Related U.S. Application Data

(60) Provisional application No. 60/780,539, filed on Mar. 9, 2006.

(51) Int. Cl.
*C09K 8/035* (2006.01)
(52) U.S. Cl. .................. 507/266; 507/136; 507/261
(58) Field of Classification Search .................. 507/136, 507/261, 266
See application file for complete search history.

(56) References Cited

U.S. PATENT DOCUMENTS

| | | | |
|---|---|---|---|
| 2,666,774 A | | 1/1954 | Grenall |
| 2,828,265 A | * | 3/1958 | Van Strien .............. 516/102 |
| 4,662,448 A | | 5/1987 | Ashford et al. |
| 5,635,458 A | | 6/1997 | Lee et al. |
| 5,728,652 A | * | 3/1998 | Dobson et al. ............ 507/145 |
| 5,919,738 A | * | 7/1999 | Norfleet et al. ........... 507/136 |
| 5,981,447 A | | 11/1999 | Chang et al. |
| 6,291,405 B1 | * | 9/2001 | Lee et al. ................. 507/136 |
| 6,291,406 B1 | | 9/2001 | Rose et al. |
| 6,325,149 B1 | | 12/2001 | Dobson, Jr. et al. |
| 6,367,548 B1 | | 4/2002 | Purvis et al. |
| 6,489,270 B1 | * | 12/2002 | Vollmer et al. ............ 507/261 |
| 6,763,888 B1 | | 7/2004 | Harris et al. |
| 6,790,812 B2 | | 9/2004 | Halliday et al. |
| 2002/0117457 A1 | * | 8/2002 | Benton et al. ............ 210/749 |
| 2005/0101490 A1 | | 5/2005 | Vollmer |

OTHER PUBLICATIONS

Official Action issued in Eurasian Application No. 200870338 dated Mar. 2, 2009 with Translation (4 pages).
PCT International Search Report dated Aug. 13, 2007 issued in International Application No. PCT/US2007/063706 (3 pages).
PCT Written Opinion dated Aug. 13, 2007 issued in International Application No. PCT/US2007/063706 (6 pages).
Office Action for related Australian Application No. 2007222983 dated Jan. 8, 2010. (2 pages).
K. Hirkoshi et al.; "Vibrational Spectra and Conformation of Polyethylene Glycol Complexed with Calcium and Magnesium Chlorides"; Journal of Molecular Structure, vol. 239, Dec. 30, 1989; XP-002573813; pp. 33-42 (10 pages).
Supplementary European Search Report issued in related European Application No. EP 07758272.4; Apr. 4, 2010 (9 pages). Examination Report issued in related Canadian Application No. 2,643,835; Mar. 23, 2010 (2 pages).
Office Action issued in Candian Application No. 2,643,835 dated Dec. 16, 2010 (2 pages).
Office Action issued in European Application No. 07758272.4 dated Jul. 20, 2010 (1 page).

* cited by examiner

*Primary Examiner* — Alicia Toscano
(74) *Attorney, Agent, or Firm* — Osha • Liang LLP

(57) ABSTRACT

A method of treating a well that includes selectively emplacing a fluid loss pill into the well, wherein the fluid loss pill includes at least one of diethylene glycol, triethylene glycol, and tetraethylene glycol, and wherein the at least one of diethylene glycol, triethylene glycol, and tetraethylene glycol reacts with a calcium brine present in the well to form a plug is disclosed.

11 Claims, 1 Drawing Sheet

DIVERTING COMPOSITIONS, FLUID LOSS CONTROL PILLS, AND BREAKERS THEREOF

CROSS-REFERENCE TO RELATED APPLICATIONS

This application claims priority, pursuant to 35 U.S.C. §119(e) to U.S. Patent Application Ser. No. 60/780,539, filed on Mar. 9, 2006, which is herein incorporated by reference in its entirety.

BACKGROUND OF INVENTION

1. Field of the Invention

The present invention relates generally to controlling fluid loss to a formation and diverting treatments for stimulating, selectively stimulating, or selectively de-stimulating a well.

2. Background Art

When drilling or completing wells in earth formations, various fluids typically are used in the well for a variety of reasons. For the purposes herein, these fluids will be generically referred to as "well fluids." Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, minimizing fluid loss into the formation after the well has been drilled and during completion operations such as, for example, perforating the well, replacing a tool, attaching a screen to the end of the production tubulars, gravel-packing the well, or fracturing the formation in the vicinity of the well, displacing the fluid within the well with another fluid, cleaning the well, testing the well, emplacing a packer and packer fluid, abandoning the well or preparing the well for abandonment, and otherwise treating the well or the formation.

Brines (such as, for example, aqueous $CaBr_2$) commonly are used as well fluids because of their wide density range and the fact that brines are typically substantially free of suspended solids. In addition, brines are often used in order to achieve a suitable density for use in well-drilling operations. Typically, brines comprise halide salts of mono- or divalent cations, such as sodium, potassium, calcium, and zinc. Chloride-based brines of this type have been used in the petroleum industry for over 50 years; bromide-based brines, for at least 25 years; and formate-based brines, for roughly the past ten years. One additional advantage of using brines is that brines typically do not damage certain types of downhole formations; and for formations that are found to interact adversely with one type of brine, often there is another type of brine available with which that formation will not interact adversely.

A variety of compounds are typically added to brine-based well fluids. For example, a brine-based well fluid may also include viscosifiers, corrosion inhibitors, lubricants, pH control additives, surfactants, solvents, and/or weighting agents, among other additives. Some typical brine-based well fluid viscosifying additives include natural polymers and derivatives thereof such as xanthan gum and hydroxyethyl cellulose (HEC). In addition, a wide variety of polysaccharides and polysaccharide derivatives may be used, as is well known in the art.

Some synthetic polymer and oligomer additives such as poly(ethylene glycol) [PEG], poly(diallyl amine), poly(acrylamide), poly(aminomethylpropylsulfonate) [AMPS polymer], poly(acrylonitrile), poly(vinyl acetate) [PVA], poly(vinyl alcohol) [PVOH], polyvinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam), and co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam are also often used as viscosifiers.

One example of how a brine-based well fluid may be used in combination with the above listed polymers and oligomers is set forth below. When drilling progresses to the depth of penetrating a hydrocarbon bearing formation, special care may be required to maintain the stability of the wellbore. Examples of formations in which stability problems often arise include highly permeable and/or poorly consolidated formations. In these types of formations, a drilling technique known as "under-reaming" may be used. In under-reaming, the wellbore is drilled to penetrate the hydrocarbon bearing zone using conventional techniques. A casing generally is set in the wellbore to a point just above the hydrocarbon bearing zone. The hydrocarbon bearing zone then may be re-drilled, for example, using an expandable under-reamer that increases the diameter of the already-drilled wellbore below the casing.

Under-reaming is usually performed using special "clean" drilling fluids. Typical drilling fluids used in under-reaming are expensive, aqueous, dense brines that are viscosified with a gelling and/or crosslinked polymer to aid in the removal of formation cuttings. The high permeability of the target formation, however, may allow large quantities of the drilling fluid to be lost into the formation. Once the drilling fluid is lost into the formation, it becomes difficult to remove. Calcium and zinc bromide brines can form highly stable, acid insoluble compounds when reacted with the formation or substances contained therein. This reaction may reduce the permeability of the formation to any subsequent out-flow of targeted hydrocarbons. One of the most effective ways to prevent such damage to the formation is to limit fluid loss into the formation.

For a drilling fluid to perform these functions and allow drilling to continue, the drilling fluid must stay in the borehole. Frequently, undesirable formation conditions are encountered in which substantial amounts or, in some cases, practically all of the drilling fluid may be lost to the formation. Drilling fluid can leave the borehole through large or small fissures or fractures in the formation or through a highly porous rock matrix surrounding the borehole.

Most wells are drilled with the intent of forming a filter cake of varying thickness on the sides of the borehole. The primary purpose of the filter cake is to reduce the large losses of drilling fluid to the surrounding formation. Unfortunately, formation conditions are frequently encountered which may result in unacceptable losses of drilling fluid to the surrounding formation despite the type of drilling fluid employed and filter cake created.

Providing effective fluid loss control without damaging formation permeability in completion operations has been a prime requirement for an ideal fluid loss-control pill. Conventional fluid loss control pills include oil-soluble resins, calcium carbonate, and graded salt fluid loss additives, which have been used with varying degrees of fluid loss control. These pills achieve their fluid loss control from the presence of solvent-specific solids that rely on filter-cake build up on the face of the formation to inhibit flow into and through the formation. However, these additive materials can cause severe damage to near-wellbore areas after their application. This damage can significantly reduce production levels if the formation permeability is not restored to its original level. Further, at a suitable point in the completion operation, the filter cake must be removed to restore the formation's permeability, preferably to its original level.

A major disadvantage of using these conventional fluid loss additives is the long periods of clean-up required after their use. Fluid circulation, which in some cases may not be achieved, is often required to provide a high driving force, which allows diffusion to take place to help dissolve the concentrated build up of materials. Graded salt particulates can be removed by circulating unsaturated salt brine to dissolve the particles. In the case of a gravel pack operation, if this occurs before gravel packing, the circulating fluid often causes sloughing of the formation into the wellbore and yet further loss of fluids to the formation.

If removal is attempted after the gravel pack, the gravel packing material often traps the particles against the formation and makes removal much more difficult. Other particulates, such as the carbonates can be removed with circulation of acid, however, the same problems may arise. Oil-soluble resins, carbonate, and graded salt particulate will remain isolated in the pores of the formation unless they are in contact with solvent. In the cases where the solid materials cover a long section of wellbore, the rapid dissolution by solvent causes localized removal, Consequently, a thief zone forms and the majority of the solvent leaks through the thief zone instead of spreading over the entire wellbore length.

Additionally, in stimulation treatments, such as acidization, hydraulic fracturing, etc., it is often desirable to plug a more permeable area of the formation to divert treatment fluids to less permeable areas receiving inadequate treatment. Well treatments, such as acid and fracture treatments of subterranean formations are routinely used to improve or stimulate the recovery of hydrocarbons. In many cases, a subterranean formation may include two or more intervals having varying permeability and/or injectivity. Some intervals may possess relatively low injectivity, or ability to accept injected fluids, due to relatively low permeability, high in-situ stress, and/or formation damage. Such intervals may be completed through perforations in a cased wellbore and/or may be completed open hole. In some cases, such formation intervals may be present in a highly deviated or horizontal section of a wellbore, for example, a lateral open hole section. In any case, when treating multiple intervals having variable injectivity it is often the case that most, if not all, of the introduced well treatment fluid will be displaced into one, or only a few, of the intervals having the highest injectivity.

In an effort to more evenly distribute displaced well treatment fluids into each of the multiple intervals being treated, methods and materials for diverting treatment fluids into intervals of lower permeability and/or injectivity have been developed. However, conventional diversion techniques may be costly and/or may achieve only limited success. In this regard, mechanical diversion techniques are typically complicated and costly. Furthermore, mechanical diversion methods are typically limited to cased hole environments and depend upon adequate cement and tool isolation for achieving diversion.

Alternatively, diversion agents such as polymers, suspended solid materials and/or foam have been employed when simultaneously treating multiple intervals of variable injectivity. Such diversion agents are typically pumped into a subterranean formation prior to a well treatment fluid in order to seal off intervals of higher permeability and divert the well treatment fluid to intervals of lower permeability. However, the diverting action of such diversion agents is often difficult to predict and monitor, and may not be successful in diverting treatment fluid into all desired intervals. Additionally, while it is desirable for these viscous gels to be stable at the bottom-hole temperature, it is also desirable that they be removable from the formation rapidly after the treatment in order to eliminate any potential damage to the high permeability intervals.

Oil-soluble resins have previously been used as a diverting treatment. These resins, however, only dissolve when contacted by oil. If used in a water-wet environment, the oil-soluble resins generally present difficulties in breaking the plug of resin to allow for removal from the formation.

The use of water-soluble polymers coupled with proper concentration of cross-linker(s) as diverting agents has become a common practice in recent years for oil recovery applications. In such practice a solution containing the polymer and cross-linker(s), referred to as gelant, is injected in desired zones and allowed sufficient time to set into a solid or semi-solid gel. These gels are used in injection wells to divert the flow of injected water or gas ($CO_2$) to un-swept zones where additional oil can be recovered. Cross-linked polymer gel may have more use in a more permanent application as practical breaker systems are not always effective in removing the gelled plug. Typically, oxidizing agents at low pH have the most success in breaking the cross-linked polymer gel; however, these breaker systems are hard on the metallurgy as they tend to be fairly corrosive.

Accordingly, there exists a need for a stable fluid loss treatment that may be easily emplaced in the well and removed with ease without causing damage downhole.

SUMMARY OF INVENTION

In one aspect, embodiments disclosed herein relate to a method of treating a well, that includes selectively emplacing a fluid loss pill into the well, wherein the fluid loss pill includes at least one of diethylene glycol, triethylene glycol, and tetraethylene glycol, and wherein the at least one of diethylene glycol, triethylene glycol, and tetraethylene glycol reacts with a calcium brine present in the well to form a plug.

In another aspect, embodiments disclosed herein relate to a method of treating a well that includes selectively emplacing a fluid loss pill into the well, wherein the fluid loss pill includes at least one of diethylene glycol, triethylene glycol, and tetraethylene glycol, and wherein the at least one of diethylene glycol, triethylene glycol, and tetraethylene glycol reacts with a calcium brine present in the well to form a plug, wherein the calcium brine includes at least one of $CaCl_2$ and $CaBr_2$.

In yet another aspect, embodiments disclosed herein relate to a composition obtained by mixing calcium brine and at least one of diethylene glycol, triethylene glycol, and tetraethylene glycol, wherein the calcium brine includes at least one of $CaBr_2$ and $CaCl_2$.

Other aspects and advantages of the invention will be apparent from the following description and the appended claims.

DETAILED DESCRIPTION

Figure 1:
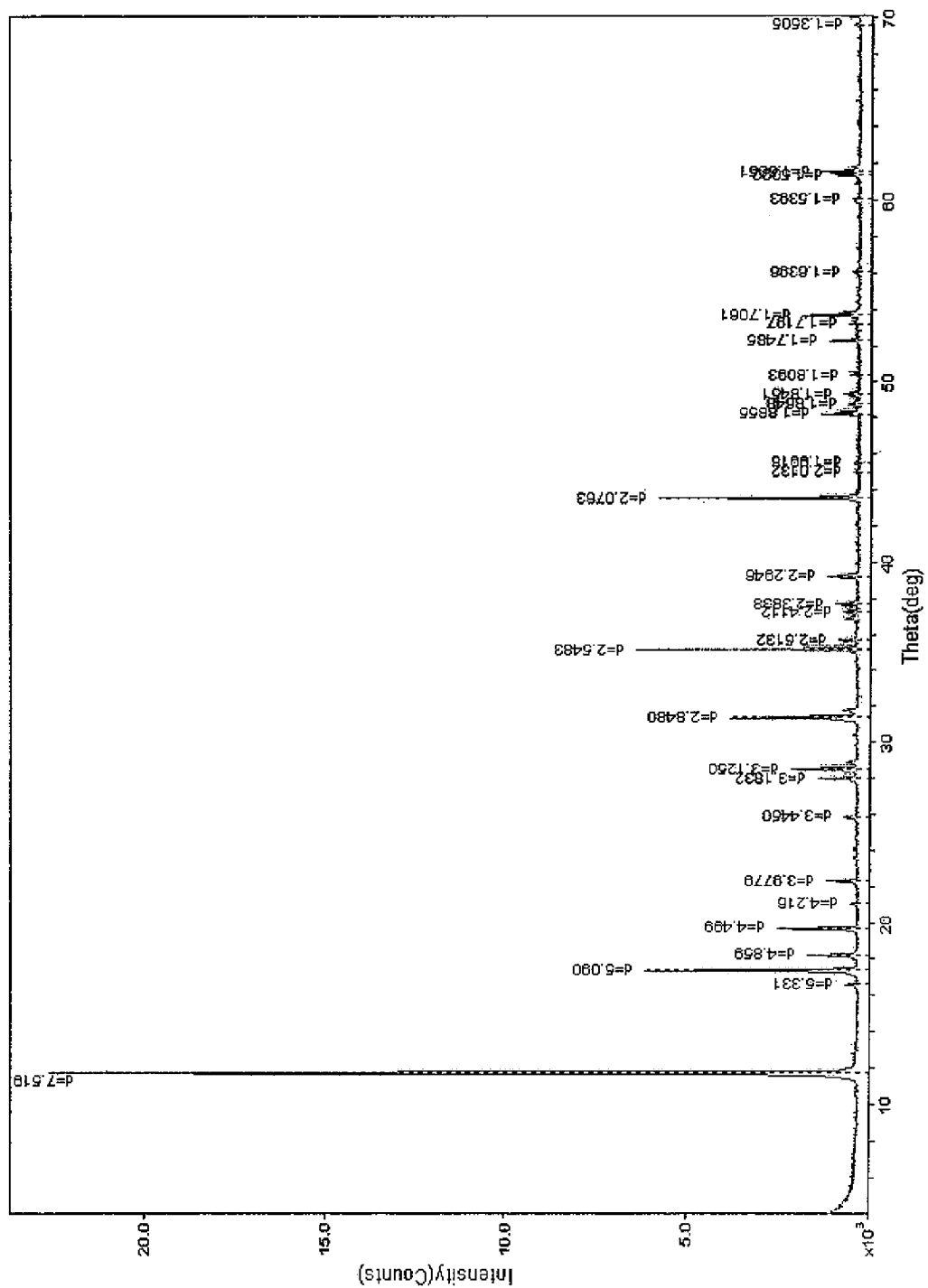
FIG. 1 is an x-ray diffraction spectrum of a solid formed according to one embodiment disclosed herein.

In one aspect, embodiments disclosed herein are generally related to compositions and processes for increasing fluid loss control in downhole applications. Further, the embodiments disclosed herein also relate to selective diverting treatments in the wellbore. As described above, when fluid is lost to a formation or when it is desirable to divert treatment fluids from a more permeable zone to a less permeable zone of the formation, a plug may be formed on permeable zones of the formation. As used herein, a "plug" means a solid or gel material that may block or more preferably may only temporarily block permeable zones of a formation to prevent or reduce loss of fluid to those zones.

In one embodiment, a plug, as disclosed herein, may be formed by reacting a fluid loss pill comprising a glycol with calcium brine to form a calcium-glycol complex. Upon the reaction of glycol and calcium salts, the calcium-glycol complex precipitates out of solution so that it may be used as a plug to reduce well fluids from permeating into the formation. The calcium-glycol complex that precipitates out of solution and forms the plug disclosed herein is water-soluble, yet is slow to dissolve in a high density brine.

The fluid loss pill or diverting treatment may include a glycol, specifically at least one of diethylene glycol and triethylene glycol, which may react with calcium salt to form a plug. In other embodiments, the fluid loss pill or diverting treatment may also include tetraethylene glycol. The glycol-containing fluid loss pill or diverting treatment may be substantially polymer-free. As used herein, "substantially polymer-free" means that fluid loss pills or diverting treatments are comprised of no more than 5% polymers by weight.

Additives that may optionally be included in the fluid loss pill or diverting treatment include corrosion inhibitors, viscosifying additives, biocides, mutual solvents, surfactants, wetting agents, pH control additives, buffering agents, lubricants, filter control agents, thinners, and weight up agents.

Some typical viscosifying additives include natural polymers and derivatives such as xantham gum and hydroxyethyl cellulose (HEC) or synthetic polymers and oligomers such as poly(ethylene glycol) [PEG], poly(diallyl amine), poly(acrylamide), poly(aminomethylpropylsulfonate) [AMPS polymer], poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam) and co-, ter-, and quaterpolymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam. Yet other viscosifiers include clay-based viscosifiers, especially laponite and other small fibrous clays such as the polygorskites (attapulgite and sepiolite). When using polymer-containing viscosifiers, the viscosifiers may be used in an amount of up to 5% by weight of the fluid loss pill so that the pill is substantially polymer-free.

Brines suitable for use with the fluid loss pills and diverting treatments disclosed herein include any solution useful in oil and gas well drilling systems and in similar applications, such as solutions used in drilling, producing and storing oil and gas from subterranean earth formations. The solutions typically contain metal salts, such as but not limited to, transition metal salts, alkali metal salts, alkaline earth metal salts, and mixtures thereof. In one embodiment, the brine includes at least one of calcium bromide and calcium chloride. In other embodiments, the brine includes a mixture of calcium bromide and calcium chloride. In yet other embodiments, other salts may be optionally included in the brine solution with the at least one of calcium bromide and calcium chloride.

The brine solution can include the salts in conventional amounts, generally ranging from about 1% to about 80%, preferably from about 50% to about 80%, and most preferably from about 60% to about 75%, based on the total weight of the solution, although as the skilled artisan will appreciate, amounts outside of this range can be used as well. Though the fluid loss control pill works at all brine concentrations, optimization of brine type and concentration may be necessary for the best performance of the fluid. In one embodiment, the brine solution may range from about 8.4 to 11.6 ppg $CaCl_2$, from about 8.4 to 14.8 ppg $CaBr_2$, or from about 8.4 to about 15.1 ppg $CaCl_2/CaBr_2$ mixtures; and preferably the brine solution may range from about 10.9 to 11.6 ppg $CaCl_2$, from about 13.0 to 14.8 ppg $CaBr_2$, or from about 10.9 to about 15.1 ppg $CaCl_2/CaBr_2$ mixtures. In another embodiment, the brine may also contain at least one of a transition metal salt, an alkali metal salt, an alkaline earth metal salt, and mixtures thereof, with said brine solution ranging in density from about 8.4 to about 25 ppg, preferably from about 10.9 to about 25 ppg, and more preferably from about 10.9 to about 20 ppg.

The brine or wellbore fluid containing the brine may also include various additives, including corrosion inhibitors, viscosifying additives, biocides, mutual solvents, surfactants, wetting agents, pH control additives, buffering agents, lubricants, filter control agents, thinners, and weight up agents. Such compounds should be known to one of ordinary skill in the art of formulating drilling fluids.

Thinners such as lignosulfonates are also often added to water-base drilling fluids. Typically lignosulfonates, modified lignosulfonates, polyphosphates, and tannins are added. In other embodiments, low molecular weight polyacrylates can also be added as thinners. Thinners are added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures.

The type and quantity of a weighting agent used depends upon the desired density of the final drilling fluid composition. Typical weighting agents include, but are not limited to: suspendable solids such as, for example, barite, iron oxide, calcium carbonate, magnesium carbonate, and combinations of such materials and derivatives of such materials and dissolvable solids such as, for example, calcium bromide, calcium chloride, and other salts which may be optionally included in the brine solution with the at least one of calcium bromide and calcium chloride.

The presence of the brine solution in the well prior to the emplacement of the fluid loss pill or diverting treatment may result from the brine solution being used as a drilling fluid or component of a drilling fluid used in the well. Alternatively, if fluid loss to the formation is detected, a brine solution may be injected into the well and into the area surrounding the fluid loss so that once the fluid loss pill or diverting treatment is emplaced in the well, the brine and the diverting treatment may react to form a plug that may reduce the amount of fluid loss to the formation. For example, if a well is originally drilled with a 12.0 ppg NaBr brine and excessive fluid loss is encountered, then a 12.0 ppg $CaCl_2/CaBr_2$ brine pill may be emplaced, followed by a pill of triethylene glycol to form the calcium-glycol plug.

The fluid loss pill or diverting treatment may be injected into a work string, flow to bottom of the wellbore, and then out of the work string and into the annulus between the work string and the casing or wellbore. This batch of treatment is typically referred to as a "pill." The pill may be pushed by injection of other completion fluids behind the pill to a position within the wellbore which is immediately above a portion of the formation where fluid loss is suspected. Injection of fluids into the wellbore is then stopped, and fluid loss will then move the pill toward the fluid loss location. Positioning the pill in a manner such as this is often referred to as "spotting" the pill. The fluid loss pill or diverting treatment may then react with the brine to form a plug near the wellbore surface, to significantly reduce fluid flow into the formation.

The fluid loss pill or diverting treatment may be selectively emplaced in the wellbore, for example, by spotting the pill through a coil tube or by bullheading. A downhole anemometer or similar tool may be used to detect fluid flows downhole that indicate where fluid may be lost to the formation. The relative location of the fluid loss may be determined such as through the use of radioactive tags present along the pipe string. Various methods of emplacing a pill known in the art are discussed, for example, in U.S. Pat. Nos. 4,662,448, 6,325,149, 6,367,548, 6,790,812, 6,763,888, which are herein incorporated by reference in their entirety.

If the calcium brine is emplaced in the well prior to the pill of glycol, the two "pills may be emplaced by a single coiled tubing run, wherein the two pills are separated by, for example, a highly viscosified 12.0 ppg NaBr brine spacer, so that when the two pills emerge from the end of the coiled tubing and into the wellbore, they may commingle and react to form the calcium-glycol plug. Alternatively, emplacement may be accomplished through two separate coiled tubing runs wherein the first fluid is emplaced, the coiled tubing is withdrawn and emptied, and then the coiled tubing is re-inserted and the second fluid is emplaced.

Once emplaced, the plug may be optionally removed by injecting a breaker fluid into the wellbore. In various embodiments, the breaker fluid may comprise a brine having more free water than originally in the well, a blend of brine and fresh water, or fresh water without salts. It has been noted that the calcium-glycol complex is soluble in fresh water or in brines with sufficient free water; however, the process of plug dissolution is slow. In another embodiment, to achieve a rapid break, the breaker fluid comprises a chelating agent. In another embodiment, the breaker fluid comprises an aqueous solution containing at least one of the complexing agents ethylenediamine tetraacetic acid (EDTA), diethylenetriamine pentaacetic acid (DTPA), triethylenetetramine hexaacetic acid (TTHA), 1,2-propylenediamine tetraacetic acid (PDTA), 1-phenylethylenediamine tetraacetic acid, 3,3-dimethylbutane-1,2-diamine tetraacetic acid, 1,2,3-triaminopropane hexaacetic acid, trimethylenediamine tetraacetic acid, nitrylo-triacetic acid ETA), 1,2-cyclohexadiamine tetraacetic acid, glycol ethylenediamine tetraacetic acid, tetralin-2,3-diamine tetraacetic acid, decalin-2,3-diamine tetraacetic acid, cyclohexane 1,2-diamine tetraacetic acid, cyclohexane-1,3-diamine tetraacetic acid, cyclohexane-1,4-diamine tetraacetic acid, glutamic-N,N-diacetic acid (GLDA), 3-aminophthalic-N,N-diacetic acid (APhthDA) or the like, and the various salts thereof. The breaker fluid may optionally contain additives as known by those of ordinary skill in the art of formulating drilling fluids.

The breaker solutions may be formulated, for example, by dissolving said EDTA, DTPA, TTHA, PDTA, 1-phenylethylenediamine tetraacetic acid, 3,3-dimethylbutane-1,2-diamine tetraacetic acid, 1,2,3-triaminopropane hexaacetic acid, trimethylenediamine tetraacetic acid, NTA, 1,2-cyclohexadiamine tetraacetic acid, glycol ethylenediamine tetraacetic acid, tetralin-2,3-diamine tetraacetic acid, decalin-2,3-diamine tetraacetic acid, cyclohexane 1,2-diamine tetraacetic acid, cyclohexane-1,3-diamine tetraacetic acid, cyclohexane-1,4-diamine tetraacetic acid, GLDA, APhthDA, or the like, or the various salts thereof in fresh water or in mono-valent-cation-based brines to achieve any desired solution density in the range from about 8.4 to about 25 ppg.

In one embodiment, a fluid loss pill containing triethylene glycol may be introduced to a 14.8 ppg $CaBr_2$ brine to form a plug. The amount of glycol (either di-, tri-, or tetraethylene glycol) to be applied in each pill may depend on the particular formation to be plugged to effectively control fluid loss. In one embodiment, a smaller volume of glycol may be selectively emplaced, fluid loss may be monitored, and an additional volume of glycol may be subsequently emplaced to form additional calcium-glycol precipitate. The monitoring and emplacing may be repeated until the fluid loss rate is within an acceptable range.

In another embodiment, a fluid loss pill containing triethylene glycol may be introduced to a 15.1 ppg $CaCl_2/CaBr_2$ brine. In another embodiment, a fluid loss pill containing triethylene glycol may be introduced to a 11.6 ppg $CaCl_2$ brine. In another embodiment, a fluid loss pill containing diethylene glycol may be introduced to a 14.8 ppg $CaBr_2$ brine. In another embodiment, a fluid loss pill containing diethylene glycol may be introduced to a 15.1 ppg $CaCl_2/CaBr_2$ brine. In another embodiment, a fluid loss pill containing diethylene glycol may be introduced to a 11.6 ppg $CaCl_2$ brine. In another embodiment, a fluid loss pill containing tetraethylene glycol may be introduced to a 14.8 ppg $CaBr_2$ brine. In another embodiment, a fluid loss pill containing tetraethylene glycol may be introduced to a 15.1 ppg $CaCl_2/CaBr_2$ brine. In another embodiment, a fluid loss pill containing tetraethylene glycol may be introduced to a 11.6 ppg $CaCl_2$ brine. In another embodiment, a fluid loss pill containing triethylene glycol may be introduced to a 13.0 ppg $CaBr_2$ brine. In another embodiment, a fluid loss pill containing triethylene glycol may be introduced to a 10.9 ppg $CaCl_2/CaBr_2$ brine. In another embodiment, a fluid loss pill containing triethylene glycol may be introduced to a 10.9 ppg $CaCl_2$ brine. In another embodiment, a fluid loss pill containing diethylene glycol may be introduced to a 13.0 ppg $CaBr_2$ brine. In another embodiment, a fluid loss pill containing diethylene glycol may be introduced to a 10.9 ppg $CaCl_2/CaBr_2$ brine. In another embodiment, a fluid loss pill containing diethylene glycol may be introduced to a 10.9 ppg $CaCl_2$ brine. In another embodiment, a fluid loss pill containing tetraethylene glycol may be introduced to a 13.0 ppg $CaBr_2$ brine. In another embodiment, a fluid loss pill containing tetraethylene glycol may be introduced to a 10.9 ppg $CaCl_2/CaBr_2$ brine. In another embodiment, a fluid loss pill containing tetraethylene glycol may be introduced to a 10.9 ppg $CaCl_2$ brine.

In another embodiment, a fluid loss pill containing separated slugs of triethylene glycol and 13.0 to 14.8 ppg $CaBr_2$ brine may be introduced to a wellbore containing NaCl- or NaBr-based brine. In another embodiment, a fluid loss pill containing separated slugs of triethylene glycol and 10.9 to 15.1 ppg CaCl$_2$/CaBr$_2$ brine may be introduced to a wellbore containing NaCl- or NaBr-based brine. In another embodiment, a fluid loss pill containing separated slugs of triethylene glycol and 10.9 to 11.6 ppg CaCl$_2$ brine may be introduced to a wellbore containing NaCl- or NaBr-based brine. In another embodiment, a fluid loss pill containing separated slugs of diethylene glycol and 13.0 to 14.8 ppg CaBr$_2$ brine may be introduced to a wellbore containing NaCl- or NaBr-based brine. In another embodiment, a fluid loss pill containing separated slugs of diethylene glycol and 10.9 to 15.1 ppg CaCl$_2$/CaBr$_2$ brine may be introduced to a wellbore containing NaCl- or NaBr-based brine. In another embodiment, a fluid loss pill containing separated slugs of diethylene glycol and 10.9 to 11.6 ppg CaCl$_2$ brine may be introduced to a wellbore containing NaCl- or NaBr-based brine. In another embodiment, a fluid loss pill containing separated slugs of tetraethylene glycol and 13.0 to 14.8 ppg CaBr$_2$ brine may be introduced to a wellbore containing NaCl- or NaBr-based brine. In another embodiment, a fluid loss pill containing separated slugs of tetraethylene glycol and 10.9 to 15.1 ppg CaCl$_2$/CaBr$_2$ brine may be introduced to a wellbore containing NaCl- or NaBr-based brine. In another embodiment, a fluid loss pill containing separated slugs of tetraethylene glycol and 10.9 to 11.6 ppg CaCl$_2$ brine may be introduced to a wellbore containing NaCl- or NaBr-based brine.

EXAMPLE

A 14.2 ppg CaBr$_2$ brine was reacted with diethylene glycol to form a solid composition according to one embodiment disclosed herein. FIG. 1 shows an x-ray diffraction spectrum of the solid formed from the reaction between diethylene glycol and 14.2 ppg CaBr$_2$ brine. The peaks in the spectrum shown in FIG. 1 have been compared with those of known compounds found in currently available compound-identification databases, and none of the spectra of those known compounds match the spectrum displayed in FIG. 1. From this spectrum, it appears that the composition of matter produced when diethylene glycol reacts with 14.2 ppg CaBr$_2$ brine is a novel composition.

From the determination that the reaction between diethylene glycol and a 14.2 ppg CaBr$_2$ brine produces a novel composition, it also is excepted that that novel compositions of matter will be produced, for example, when triethylene glycol reacts with a 13.0 to 14.8 ppg CaBr$_2$ brine, when triethylene glycol reacts with a 10.9 to 15.1 ppg CaCl$_2$/CaBr$_2$ brine, when triethylene glycol reacts with a 10.9 to 11.6 ppg CaCl$_2$ brine, when diethylene glycol reacts with a 13.0 to 14.8 ppg CaBr$_2$ brine, when diethylene glycol reacts with a 10.9 to 15.1 ppg CaCl$_2$/CaBr$_2$ brine, when diethylene glycol reacts with a 10.9 to 11.6 ppg CaCl$_2$ brine, when tetraethylene glycol reacts with a 13.0 to 14.8 ppg CaBr$_2$ brine, when tetraethylene glycol reacts with a 10.9 to 15.1 ppg CaCl$_2$/CaBr$_2$ brine, and when tetraethylene glycol reacts with a 10.9 to 11.6 ppg CaCl$_2$ brine.

Advantageously, embodiments of the present invention provide for a fluid loss additive that may reduce or substantially eliminate fluid loss to the formation in a wellbore containing brine. The formation of the calcium-brine complex may also allow for a temporary and selective diverting treatment, in which the fluid loss control may be selectively applied to particular segments of the wellbore or formation zones. The water-solubility of the calcium-brine complex allows for a plug that may be slowly removed over time without the addition of any breakers or readily removable with the addition of a breaker fluid without exposing the formation or downhole tools, screens, valves, etc., to harsh conditions that can cause permanent formation damage, wellbore instability, or corrosion of wellbore construction metallurgy. The complex may also possess stability at high temperatures without threat of polymer degradation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of treating a well, comprising:
selectively emplacing a fluid loss pill into the well, the well having a calcium brine having a density of about 10.9 pounds per gallon to about 15.1 pounds per gallon therein, wherein the fluid loss pill comprises at least one of diethylene glycol, triethylene glycol, and tetraethylene glycol, wherein the fluid loss pill excludes a calcium brine, and wherein the at least one of diethylene glycol, triethylene glycol, and tetraethylene glycol reacts with the calcium brine present in the well to form a plug.

2. The method of claim 1, wherein the calcium brine comprises at least one of CaCl$_2$ and CaBr$_2$.

3. The method of claim 1, wherein the well comprises at least one problematic hydrocarbon-containing zone and at least one non-problematic zone, and wherein the selective emplacing comprises emplacing the fluid loss pill at the at least one non-problematic zone.

4. The method of claim 1, wherein the plug comprises a product of a reaction between calcium ions and glycol.

5. The method of claim 1, further comprising:
injecting a breaker fluid into the well, the breaker fluid comprising at least one of ethylenediaminetetraacetic acid, diethylene triamine pentaacetic acid, triethylenetetramine hexaacetic acid, 1,2-propylenediamine tetraacetic acid, 1-phenylethylenediamine tetraacetic acid, 3,3-dimethylbutane-1,2-diamine tetraacetic acid, 1,2,3-triaminopropane hexaacetic acid, trimethylenediamine tetraacetic acid, nitrylo-triacetic acid, 1,2-cyclohexadiamine tetraacetic acid, glycol ethylenediamine tetraacetic acid, tetralin-2,3-diamine tetraacetic acid, decalin-2, 3-diamine tetraacetic acid, cyclohexane 1,2-diamine tetraacetic acid, cyclohexane-1,3-diamine tetraacetic acid, cyclohexane-1,4-diamine tetraacetic acid, glutamic-N,N-diacetic acid, 3-amino-phthalic-N, N-diacetic acid, and salts thereof.

6. The method of claim 1, further comprising:
removing the plug from the well.

7. The method of claim 1, further comprising:
drilling the well with a calcium brine.

8. The method of claim 1, further comprising:
injecting additional calcium brine into well after the selective emplacement of the fluid loss pill; and
selectively emplacing an additional fluid loss pill into the well, wherein the additional fluid loss pill comprises at least one of diethylene glycol, triethylene glycol, and tetraethylene glycol.

9. A method of treating a well, comprising:
selectively emplacing a fluid loss pill into the well, the well having a calcium brine having a density of about 10.9 pounds per gallon to about 15.1 pounds per gallon therein, wherein the fluid loss pill comprises at least one of diethylene glycol, triethylene glycol, and tetraethylene glycol, wherein the fluid loss pill excludes a calcium brine, wherein the at least one of diethylene glycol, triethylene glycol, and tetraethylene glycol reacts with the calcium brine present in the well to form a plug, and wherein the calcium brine comprises at least one of $CaCl_2$ and $CaBr_2$.

10. The method of claim 9, wherein the well comprises at least one problematic hydrocarbon-containing zone and at least one non-problematic zone, and wherein the selective emplacing comprises emplacing the fluid loss pill at the at least one non-problematic zone.

11. The method of claim 9, further comprising:
injecting a breaker fluid into the well, the breaker fluid comprising at least one of ethylenediaminetetraacetic acid, diethylene triamine pentaacetic acid, triethylenetetramine hexaacetic acid, 1,2-propylenediamine tetraacetic acid, 1-phenylethylenediamine tetraacetic acid, 3,3-dimethylbutane-1,2-diamine tetraacetic acid, 1,2,3-triaminopropane hexaacetic acid, trimethylenediamine tetraacetic acid, nitrylo-triacetic acid, 1,2-cyclohexadiamine tetraacetic acid, glycol ethylenediamine tetraacetic acid, tetralin-2,3-diamine tetraacetic acid, decalin-2,3-diamine tetraacetic acid, cyclohexane 1,2-diamine tetraacetic acid, cyclohexane-1,3-diamine tetraacetic acid, cyclohexane-1,4-diamine tetraacetic acid, glutamic-N,N-diacetic acid, 3-amino-phthalic-N,N-diacetic acid, and salts thereof.

* * * * *